(12) United States Patent
Fix et al.

(10) Patent No.: US 7,961,201 B1
(45) Date of Patent: Jun. 14, 2011

(54) METHOD AND APPARATUS FOR PRODUCING GRAPHICAL MACHINE VISION CONTENT FOR DISTRIBUTION VIA A NETWORK

(75) Inventors: Raymond A. Fix, Natick, MA (US); Aaron S. Wallack, Natick, MA (US)

(73) Assignee: Cognex Corporation, Natick, MA (US)

( * ) Notice: Subject to any disclaimer, the term of this patent is extended or adjusted under 35 U.S.C. 154(b) by 579 days.

(21) Appl. No.: 09/742,895

(22) Filed: Dec. 21, 2000

(51) Int. Cl.
*G06T 15/00* (2006.01)

(52) U.S. Cl. .......... 345/629; 345/636; 701/32; 715/736

(58) Field of Classification Search .......... 365/619, 365/630, 636; 345/629, 630, 636; 701/32; 715/512, 733, 734, 736
See application file for complete search history.

(56) References Cited

U.S. PATENT DOCUMENTS

| | | | |
|---|---|---|---|
| 4,641,356 A | 2/1987 | Sternberg | |
| 4,975,972 A | 12/1990 | Bose et al. | |
| 4,985,846 A | 1/1991 | Fallon | |
| 5,040,228 A | 8/1991 | Bose et al. | |
| 5,081,529 A | 1/1992 | Collette | |
| 5,327,265 A | 7/1994 | McDonald et al. | |
| 5,414,626 A * | 5/1995 | Boorse et al. | 701/32 |
| 5,481,712 A | 1/1996 | Silver et al. | |
| 5,495,535 A * | 2/1996 | Smilansky et al. | 382/145 |
| 5,530,942 A * | 6/1996 | Tzou et al. | 715/512 |
| 5,563,720 A | 10/1996 | Edgar | |
| 5,600,150 A * | 2/1997 | Stern et al. | 250/559.29 |
| 5,666,215 A | 9/1997 | Fredlund et al. | |
| 5,673,334 A | 9/1997 | Nichani et al. | |
| 5,694,484 A | 12/1997 | Cottrell et al. | |
| 5,715,051 A | 2/1998 | Luster | |
| 5,768,401 A | 6/1998 | Csipkes et al. | |
| 5,821,993 A | 10/1998 | Robinson | |
| 5,835,627 A | 11/1998 | Higgins et al. | |
| 5,861,869 A * | 1/1999 | Scheffer et al. | 345/691 |
| 5,864,984 A * | 2/1999 | McNertney | 47/58.1 R |
| 5,867,322 A | 2/1999 | Morton et al. | |
| 5,928,335 A | 7/1999 | Morita et al. | |
| 5,982,362 A | 11/1999 | Crater et al. | |
| 6,025,854 A | 2/2000 | Hinz et al. | |
| 6,133,985 A | 10/2000 | Garfinkle et al. | |
| 6,298,474 B1 | 10/2001 | Blowers et al. | |
| 6,308,327 B1 * | 10/2001 | Liu et al. | 725/37 |

(Continued)

FOREIGN PATENT DOCUMENTS

JP 09130783 5/1997

(Continued)

OTHER PUBLICATIONS

Roudsari et al., Web-based Decision Support and Telemonitoring System for the Management of Diabetes, Engineer in Medicin and Biology Society, Jul. 2000, pp. 1120 vol. 2.*

(Continued)

*Primary Examiner* — Phu K Nguyen

(57) ABSTRACT

A method and system is provided for viewing machine vision information. The machine vision information includes machine vision data representing a sequence of machine vision processing steps. The machine vision information pertaining to a machine vision process on a given machine vision processor is produced. The machine vision information is displayed at a device remotely located from the given machine vision processor. A selection interface is provided on the device to allow a user to view the machine vision data corresponding to at least one stage of the machine vision processing.

27 Claims, 16 Drawing Sheets

U.S. PATENT DOCUMENTS

| | | | |
|---|---|---|---|
| 6,381,357 | B1 | 4/2002 | Tan et al. |
| 6,396,942 | B1* | 5/2002 | Chang et al. ............... 382/141 |
| 6,400,374 | B2* | 6/2002 | Lanier ............................ 345/630 |
| 6,427,099 | B1 | 7/2002 | Heinemann |
| 6,438,575 | B1 | 8/2002 | Khan et al. |
| 6,466,203 | B2 | 10/2002 | Crater et al. |
| 6,471,486 | B1* | 10/2002 | Centers et al. ................ 417/18 |
| 6,493,079 | B1* | 12/2002 | Piacentini .................. 356/240.1 |
| 6,493,677 | B1 | 12/2002 | Von Rosen et al. |
| 6,529,590 | B1* | 3/2003 | Centers ...................... 379/106.01 |
| 6,531,707 | B1 | 3/2003 | Favreau et al. |
| 6,545,499 | B2* | 4/2003 | Hashimoto ................... 324/765 |
| 6,567,122 | B1 | 5/2003 | Anderson et al. |
| 6,578,017 | B1 | 6/2003 | Ebersole et al. |
| 6,608,638 | B1 | 8/2003 | Kodosky et al. |
| 6,654,721 | B2 | 11/2003 | Handelman |
| 6,670,991 | B1 | 12/2003 | Takagi et al. |
| 6,674,445 | B1* | 1/2004 | Chithambaram et al. ..... 345/619 |
| 6,687,685 | B1* | 2/2004 | Sadeghi et al. ................ 706/15 |
| 6,763,515 | B1 | 7/2004 | Vazquez |
| 6,781,724 | B1 | 8/2004 | Szajewski et al. |
| 6,798,531 | B1 | 9/2004 | Paz-Paujalt et al. |
| 6,804,418 | B1 | 10/2004 | Yu et al. |
| 6,813,621 | B1 | 11/2004 | Taylor et al. |
| 6,830,340 | B2* | 12/2004 | Olson et al. ...................... 353/30 |
| 6,836,287 | B1 | 12/2004 | Nakahara |
| 6,915,273 | B1 | 7/2005 | Parulski |
| 6,931,602 | B1 | 8/2005 | Silver et al. |
| 6,931,633 | B1 | 8/2005 | Vazquez et al. |
| 6,944,584 | B1* | 9/2005 | Tenney et al. ................... 703/22 |
| 7,034,825 | B2 | 4/2006 | Stowe et al. |
| 7,092,860 | B1 | 8/2006 | Wasserman |
| 7,181,059 | B2* | 2/2007 | Duvdevani et al. ........... 382/149 |
| 7,206,443 | B1* | 4/2007 | Duvdevani et al. ........... 382/149 |
| 7,218,776 | B2 | 5/2007 | Sowinski et al. |
| 7,305,114 | B2 | 12/2007 | Wolff et al. |
| 7,383,536 | B1 | 6/2008 | Marrion et al. |
| 2001/0031102 | A1 | 10/2001 | Lunetta et al. |
| 2001/0055069 | A1 | 12/2001 | Hudson et al. |
| 2002/0055947 | A1 | 5/2002 | Schultz et al. |
| 2002/0075524 | A1 | 6/2002 | Blair et al. |
| 2002/0083413 | A1 | 6/2002 | Kodosky et al. |
| 2003/0055745 | A1 | 3/2003 | Kim |
| 2004/0005396 | A1 | 1/2004 | McCall et al. |
| 2004/0100465 | A1 | 5/2004 | Stowe et al. |
| 2006/0053407 | A1 | 3/2006 | Kodosky et al. |

FOREIGN PATENT DOCUMENTS

| | | |
|---|---|---|
| JP | 2000115619 | 4/2000 |
| WO | 0215120 | 2/2002 |
| WO | 0235469 | 5/2002 |

OTHER PUBLICATIONS

Sakata et al., Quality Control and Diagnostic System for LSI Fabrication, 1994 International Symposium on Semiconductor Manufacturing, pp. 187-191.*

Network Computing article by Wade Rockett; entitled Symantec pcAnywhere 9.0 Is Just Right for Control Freaks; Nov. 15, 1999 (web printout pp. 1-3).

White Paper by Richardson et al., entitled RFB Protocol Version 3.3; ORL Cambridge; Jan. 1998; pp. 1-26.

Cognex Brochure, "PatMax", pp. 1-6, 2000.

SEC Cognex Corp. 10-K for Dec. 31, 1998, dated Mar. 26, 1999, Cover page, Table of Contents, and p. 6.

Article, Vision Systems Move Into Next Generation, Electronic Times, Feb. 8, 1999, p. 1 of 1.

AT&T Laboratories, Virtual Network Computing—http://www.hep.phy.cam.ac.uk/vnc_docs/index.html, 2000.

Telnet From Wikipedia, the free encyclopedia, TELNET (TErminaL NETwork) is a network protocol used on the Internet or local area networks, 1973.

X Window System From Wikipedia, the free encyclopedia, The X Window System (commonly X or X11), 1984.

Cognex Corporation, Cognex 8000—Machine Vision System, CVL User's Guide, CVL 4.7 590-6162, 1998.

Cognex Corporation, In-Sight Support and Learning Programs, www.cognex.com/support/insight, 2000.

Remote Desktop Services From Wikipedia, the free encyclopedia, Remote Desktop Services, formerly known as Terminal Services, pre-2000.

Cognex Corporation, MVS-8000 Product Family Software Overview, 2000.

Cognex Corporation, MVS-8000 Series, Amazon Smd Programmer's Guide, 1999.

Cognex Corporation, VPRO 0.7, Diagnostic Display, 2000.

Comaniciu, Image-guided decison support system for pathology, Spring-Verlag 2000, Machine Vision and Appliction, pp. 213-224, 2000.

Edwards, J., Machine vision and its intergration with CIM systems in the electronics manufacturing industry, Computer-Aided Engineering Journal, vol. 7, Issue 1, Feb. 1999.

Gedeon, et al, Applying Machine Vision in Electrical Component Manufacturing, Electrical Electronics Insulation Conference and Electrical Manufacturing & Coil Winding Conference, 1993, Proceedings, Chicago '93 EEIC/ICWA Exposition, pp. 737-749, Oct. 4-7, 1993.

Ho, Yeuk Fai, Model-based image processing: Analysis, Modeling, simulation and application, Abstract retrieved from ProQuest Jun. 19, 2006.

Kassim, et al, Automatic IC orientation checks, Spring-Verlag 2000, April, Machine Vision and Application, pp. 107-112.

Lenz, Reimar K., et al, Techniques for Calibration of the Scale Factor and Image Center for High Accuracy 3-D Machine Vision Metrology, IEEE, 1998.

Muscedere, Roberto, et al, A multiple in-camera processing system for machine vision, Abstract retrieved from Proquest Jun. 19, 2006.

Niederl, Franz, et al, Method Execution on a Distributed Image Processing Back-end, IEEE, pp. 243-249, May 1998.

Parvin, et al, A Collaboratie Framework for Distributed Microscopy, IEEE, pp. 1-16, 1998.

Robertson, Paul, et al, Adaptive Image Analysis for Aerial Surveillance, IEEE retrieved Jun. 19, 2006.

Rogers, Richard, et al, The ISL Document Image Analysis Toolbox, IEEE retrieved Jun. 19, 2006, publication date 1997.

Trask, Bruce, Using COBRA Asynchronous Messaging, Pluggable Protocols and the Real-Time Event Servie in a Real-Time Emedded System, <URL http://www.omg.org>search - http://www.scholar.google.com, 2000.

Cognex MVS-8000 Series, MVS-8200/PCI and MVS-82400/PCI, Hardware Manual, Jan. 2000, 590-6273.

Cognex MVS-8000 Series, MVS-8200NME and MVS-82400NME, Hardware Manual, Jan. 2000, 590-6275.

* cited by examiner

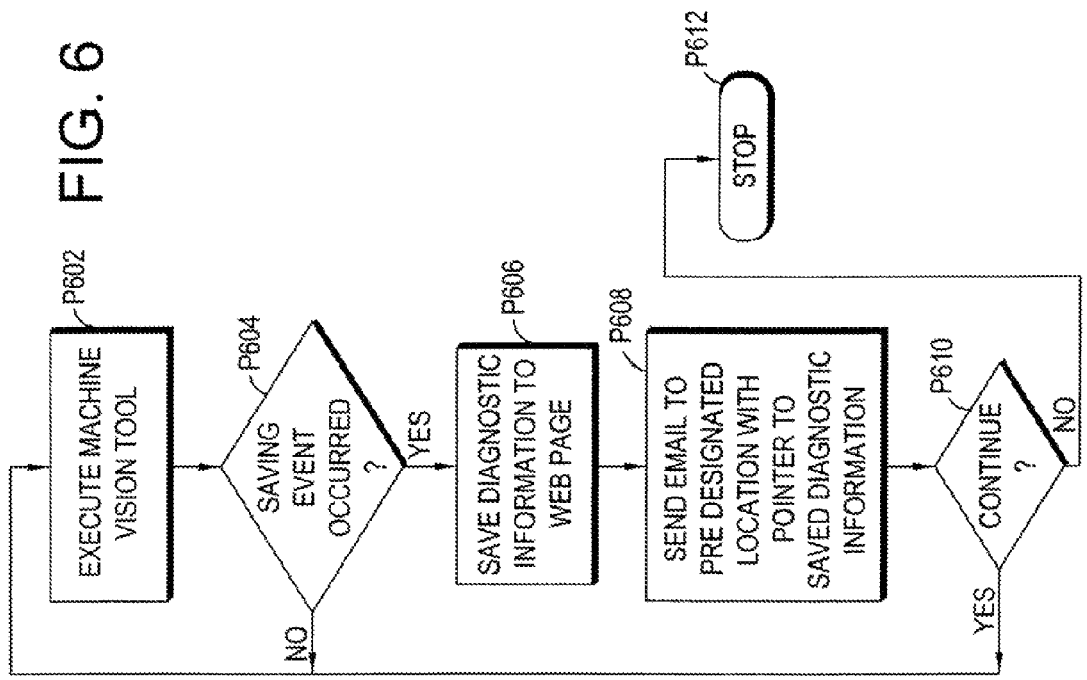
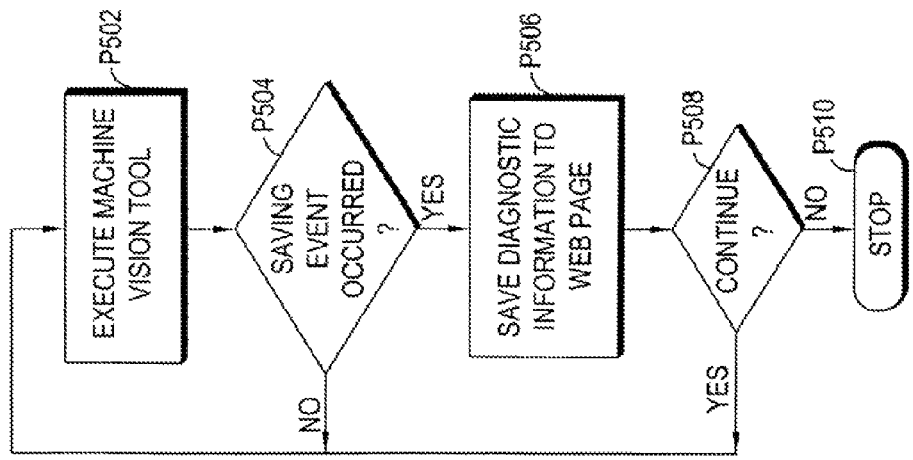

METHOD AND APPARATUS FOR PRODUCING GRAPHICAL MACHINE VISION CONTENT FOR DISTRIBUTION VIA A NETWORK

BACKGROUND

1. Reservation of Copyright

This patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

2. Field of the Invention

Aspects of the present invention relate to machine vision systems and graphical content thereof.

3. Description of Background Information

Machine vision techniques are used in applications including character recognition, industrial inspection of manufactured objects, robot guidance systems, radiology, remote sensing and detecting, and others.

Currently, machine vision applications involve the extraction of vision-related information by obtaining signals representing an image, and then performing processing on those signals. This is performed by a machine vision process which is included in a machine vision device. The machine vision process can comprise one or more machine vision tools which may provide interactive diagnostic data to a local display device. The diagnostic data is information about the currently running tool. The information may be displayed as text data, such as measurements or message strings, or in graphic form. The interactive diagnostic data aids a user in understanding the performance of the machine vision tool.

SUMMARY OF THE INVENTION

A method and system is provided for viewing machine vision information. The machine vision information includes machine vision data representing a sequence of machine vision processing steps. The machine vision information pertaining to a machine vision process on a given machine vision processor is produced. The machine vision information is displayed at a device remotely located from the given machine vision processor. A selection interface is provided on the device to allow a user to view the machine vision data corresponding to at least one stage of the machine vision processing.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein:

FIG. 5 is a flowchart illustrating processing in the machine vision tool computer in an embodiment of the invention;

FIG. 6 is a flowchart illustrating processing in the machine vision tool computer of another embodiment of the invention;

DETAILED DESCRIPTION

Figure 1:
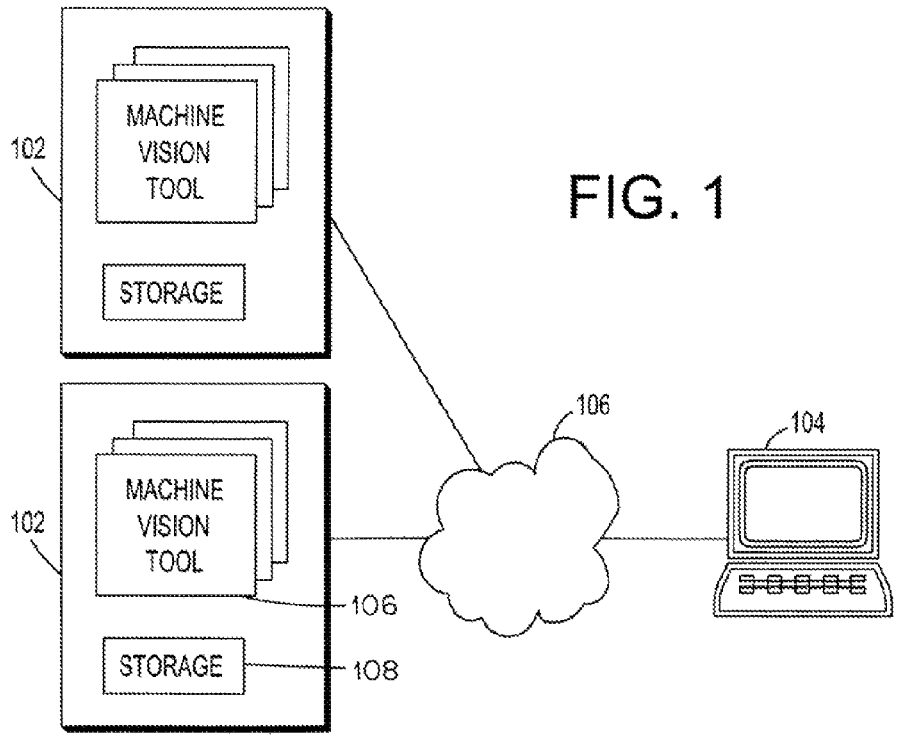
FIG. 1 illustrates a first embodiment of the invention.

FIG. 1 shows an embodiment of the invention. One or more machine vision devices 102 are connected to a network 106. The network may be a network of networks, such as the Internet, or may be, for example, an Intranet. A device having a display 104 is also connected to network 106.

Each of the machine vision devices includes at least one machine vision tool 102 having a diagnostic capability, and may optionally include a storage device 108, which may if include, for example, computer memory, a disk drive including a disk, or any other suitable storage device.

The diagnostic capability provides a user with the ability to selectively view results of processing performed by the machine vision process at discrete times within the process. For example, FIGS. 10-18, which will be discussed later, show an analyzed image and graphic and textual results of a BGA Finder tool. The BGA Finder tool is an example of a machine vision tool developed by Cognex Corporation of Natick, Mass. that takes an image of a Ball Grid Array device and information about the physical size of pixels and creates a real-world CAD description of the device. The processing results can be selectively displayed. In the illustrated example the user can select from each of the following features either individually or in any combination. The features that can be selected are coarse results, grid lines, including x lines and y lines, initial origin, results and result text, each of which indicate the results of processing at discrete times of the analysis process by the BGA Finder machine vision tool. Other examples of diagnostics include, but are not limited to, the positions of found image features, such as edges, blob centers, an amount of time to find a feature or set of features, region of interest of the image where the vision tool operated, and classification of the features, such as an expected feature or defects.

In one embodiment of the invention, the diagnostic capability sends a page, for example, a web page, of diagnostic information to a user as a result of running a machine vision tool.

Figure 2:
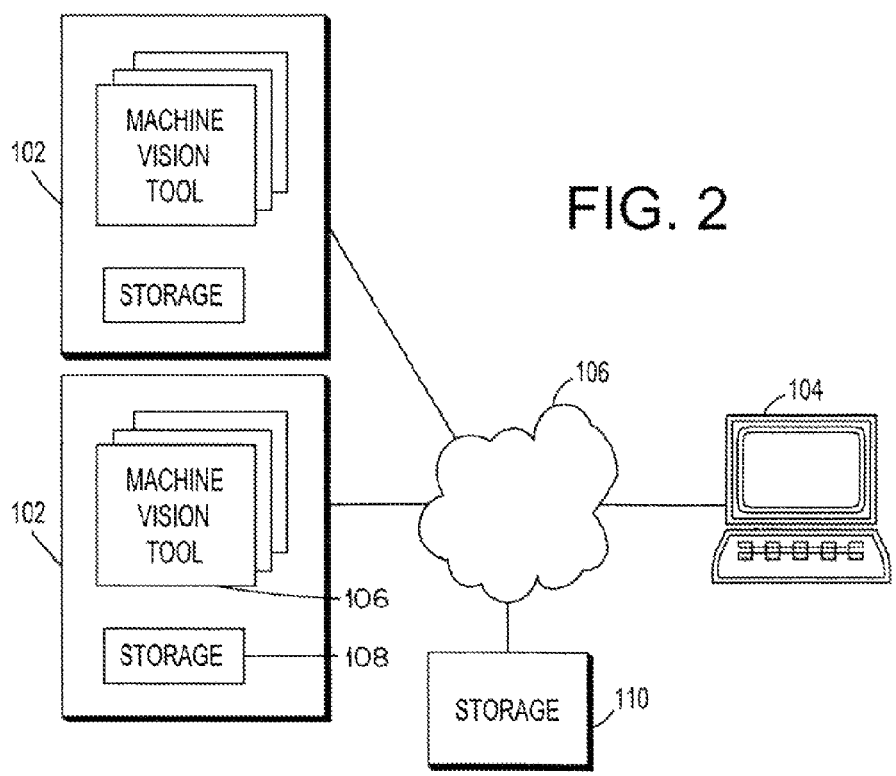
FIG. 2 illustrates a second embodiment of the invention.

FIG. 2 shows another embodiment of the invention. This embodiment is similar to the embodiment of FIG. 1, but includes a storage device 110 remotely located from the machine vision device 102. The storage device may be associated with a computer and may include a disk drive including a disk, an optical disk, a CD read/write device or any other device capable of storing data.

A machine vision tool may be pre-configured to save web page information at specific times. For example, a machine vision tool may be configured to save a web page including diagnostic information every time the machine vision tool determines that an examined object fails to meet certain criteria. The machine vision tool may also be configured to generate a web page including diagnostics every time the tool is run or every nth time the tool is run, for example, every tenth time.

In one embodiment, the invention may be configured to write and overwrite diagnostic information to a predetermined web page so that a user can always query that page for the most recent diagnostics. Previous diagnostics may be moved to other web pages such that a user can select the previous diagnostics by selecting "previous diagnostics web page" from the current diagnostics web page by, for example, using a pointing device and clicking.

The machine vision tool may save the web page including diagnostic information in a local storage device, such as storage 108, or may save the web page on a remote storage device, such as storage 110. The remote storage device 110 may be connected to network 106.

Device 104 may include, for example, a web browser or a thin client.

A web browser displays data and is capable of communicating with other computers via a network, such as, for example, the Internet or an intranet. The web browser provides a user with a way to navigate, via, for example, hyperlinks which are selected by a pointing device, such as a computer mouse, or are typed in by the user. The web browser uses a transfer protocol, for example, HyperText Transfer Protocol (HTTP) or File Transfer Protocol (FTP), to transmit data of various content, such as, for example, Hypertext Transfer Markup Language (HTML) documents, plain text documents, graphic images, and eXtensible Markup Language (XML) documents. The web browser may also run programs, such as Java applets. The web browser may be, for example, Internet Explorer by Microsoft Corporation of Redmond, Wash., Netscape Navigator by Netscape, or any other web browser.

A thin client utilizes a two or more tiered-client server model. In this model, the client runs a minimal set of services that provide functionality to interface with at least one server. A web browser may be a thin client.

The diagnostic web page produced by the machine vision tool may preferably include a vector graphics language that provides high resolution images using plain text commands. Such a language is Scaleable Vector Graphics ("SVG"), which is an open-standard vector graphics language based on Extensible Markup Language ("XML"), and is emerging as a graphics standard for web browsers. SVG was developed by a working group of the World Wide Web Consortium (W3C). SVG files are compact and provide print-quality graphics. SVG images are usually smaller and more compressible than comparable JPEG or GIF images, and thus are quicker to download and easier to send across a network. SVG images may include overlay images which can be enabled or disabled in order to display or inhibit display of the overlay images.

In alternative embodiments, the web page produced by the machine vision tool diagnostics may instead include XML format or Vector Markup Language ("VML"), developed by Microsoft Corporation of Redmond, Wash. VML is included in Microsoft's Internet Explorer, version 5.0, as well as other Microsoft products, such as Office 2000 and Powerpoint 2000.

The web browser or thin client may be capable of supporting XML, SVG or VML. Many browsers may be provided with a plug-in which allow it to support SVG format.

The web page produced by the machine vision tool may include Java Script. The web page may also include a Java Applet. The Java Script and/or the Java Applet may be used to enable or disable different overlays on the image displayed by the web browser.

Alternate embodiments of the machine vision tool may also produce a web page having diagnostics in other formats, such as JPEG, which is a standard format developed by the Joint Photographic Experts Group for graphical information, GIF, which is a standard for digitized images, defined by CompuServe, or Portable Network Graphics ("PNG") format, which is described in Request for Comments: 2083, PNG (Portable Network Graphics) specification version 1.0, March, 1997, by T. Boutell, et al.

Figure 3:
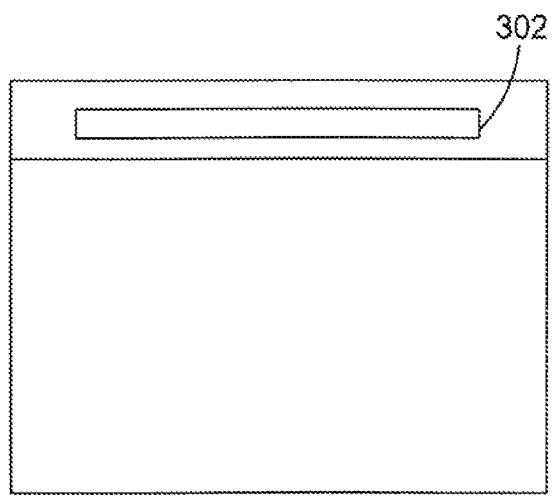
FIG. 3 illustrates a display on a screen of a display device.

FIG. 3 shows an example of a screen of a web browser. The user may access the web page including the diagnostic information by typing an address in window 302.

Figure 4C:
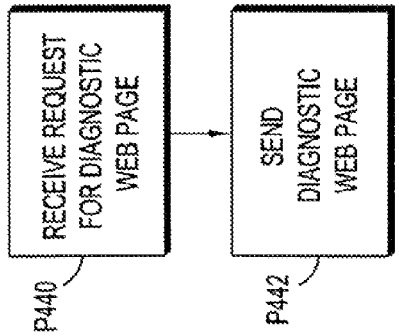
FIGS. 4A, 4B and 4C are flowcharts of the process in different embodiments of the invention.
Figure 4B:
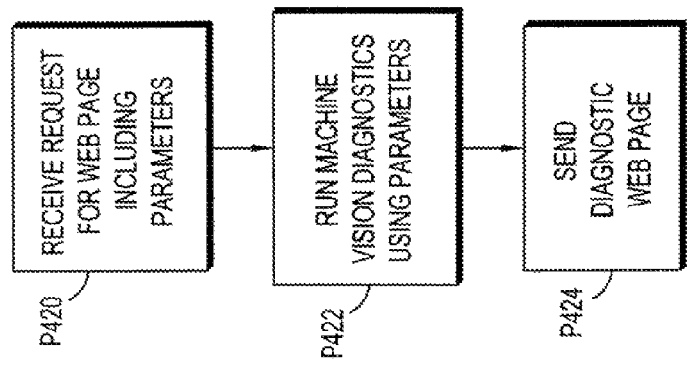
Figure 4A:
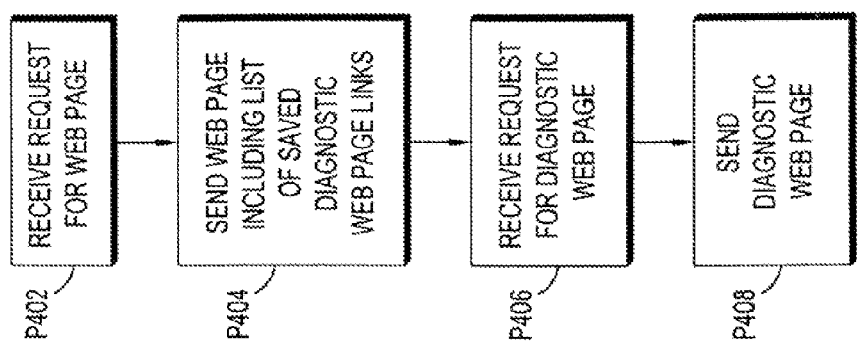

FIG. 4A is a flowchart which illustrates the processing which occurs in an embodiment of the invention.

At P402, the machine vision tool device 102 receives a request for a web page from display device 104 through network 106.

Figure 8:
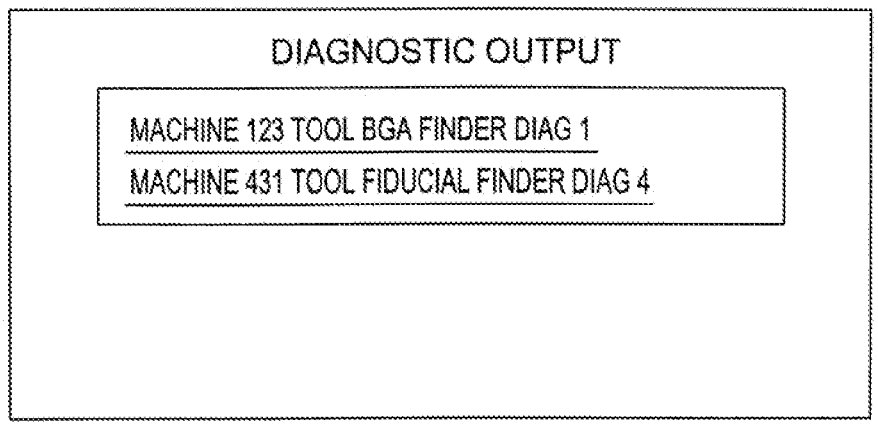
FIG. 8 illustrates a display of a web page having links to diagnostic web pages.

At P404, machine vision tool computer 102 accesses storage 108 to determine the web pages that are stored in storage 108 and sends a list of the web pages as a web page to device 104. The web page includes links to each of the saved diagnostic web pages and may be in a format which is shown in FIG. 8 and described later.

At P406, a user of device 104 selects one of the web page links causing a request for the web page to be sent to the machine vision tool computer 102, which receives the request for the web page.

At P408, machine vision tool computer 102 sends the diagnostic web page to device 104 which displays the web page.

Alternatively, a user may request a web page address which includes parameters, such that the web page address includes all information necessary to run a machine vision tool. FIG. 4B describes the processing in such an embodiment.

At P420, the machine vision tool device 102 receives a request for a web page from display device 104 through network 106. The request includes all parameters needed to run the machine vision tool via the web address information requested by the user.

At P422, the machine vision tool executes and produces, using the parameters provided by the user, the diagnostic information.

At P424, the machine vision tool sends the diagnostic information, in a form of a web page, to the user's browser for display to the user.

FIG. 4C explains the processing which occurs when the machine vision tool has been previously configured to store diagnostic information or when the user has requested diagnostic information.

The user has requested, via, for example, a web browser, diagnostic information in a form of a web page. At P440, the machine vision tool receives the request for the diagnostic web page.

At P442, the machine vision tool sends the web page to the user's web browser.

The processing illustrated in FIG. 4A may also be used in an embodiment of the invention shown in FIG. 2. In this embodiment, the request for a web page is directed toward a remote storage device 110 which receives the request for a web page at P402.

At P404, storage device 110 sends a web page including a list of the saved diagnostic web page links to device 104 which displays the list of diagnostics in an output, for example, as shown in FIG. 8, which displays the machine which originated the diagnostic web page and the tool involved. For example, FIG. 8 shows two diagnostic web pages, one from machine 123 for a BGA Finder tool and one from machine 431 for a Fiducial Finder tool.

At P406, the user selects the diagnostic web page via, for example, a pointing device, such as a computer mouse and the request for the web page is sent to storage device 110.

At P408, storage device 110 sends the diagnostic web page to device 104 for display.

FIG. 5 explains the processing in the machine vision tool 106 of a machine vision tool computer 102. The machine vision tool is pre-configured to save diagnostic information either locally to local storage 108 or to remote storage device 110 based on certain pre-configured parameters. For example, a machine vision tool could be configured to save diagnostic information each time an inspection of an object fails, after every run of the machine vision tool, or after every nth run of the machine vision tool, for example, after every tenth run of the machine vision tool.

At P502, the machine vision tool is executing.

At P504, a check is made to determine whether a saving event occurred. As mentioned above, the saving events are pre-configured. If no saving event occurred, the machine vision tool continues to execute. Otherwise, at P506, diagnostic information is saved in a form of a web page to a storage device. The storage device may be local storage device 108, for example, or remote storage device 110, via network 106.

At P508, a check is made to determine whether the machine vision tool should continue executing. If yes, at P502, the machine vision tool continues to execute. Otherwise, at P510, the machine vision tool is stopped.

FIG. 6 explains the processing in the machine vision tool in an embodiment of the invention in which email is sent to a pre-designated location to indicate the existence of saved diagnostic information.

At P602, the machine vision tool is executing.

At P604, a check is made to determine whether a saving event occurred. As mentioned above, the saving events are pre-configured. The saving events trigger the saving of diagnostic information in a web page format.

If a saving event has not occurred, the machine vision tool continues to execute, at P602. If a saving event occurred, then at P606, diagnostic information is saved in a form of a web page either to local storage device 108 or remote storage device 110.

Figure 9:
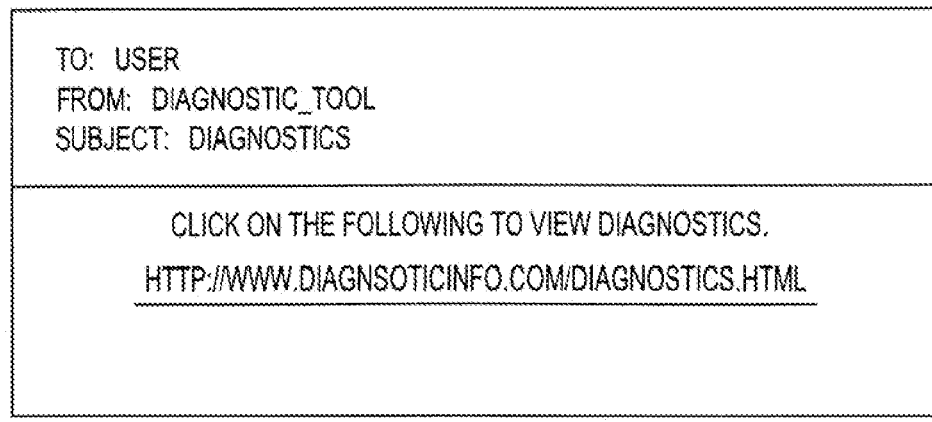
FIG. 9 shows an example of an e-mail indicating existence of a generated diagnostic web page.

At P608, an e-mail message is sent to a pre-designated location. The e-mail message contains pointers or links to the saved diagnostic information. For example, FIG. 9 is an example of an e-mail to a pre-designated user called "user" with a hypertext link to a web page containing diagnostic information.

At P610, a check is made to determine whether the machine vision tool should continue execution. If the tool should continue execution, execution continues at P602. Otherwise, at P612, execution stops.

Figure 7A:
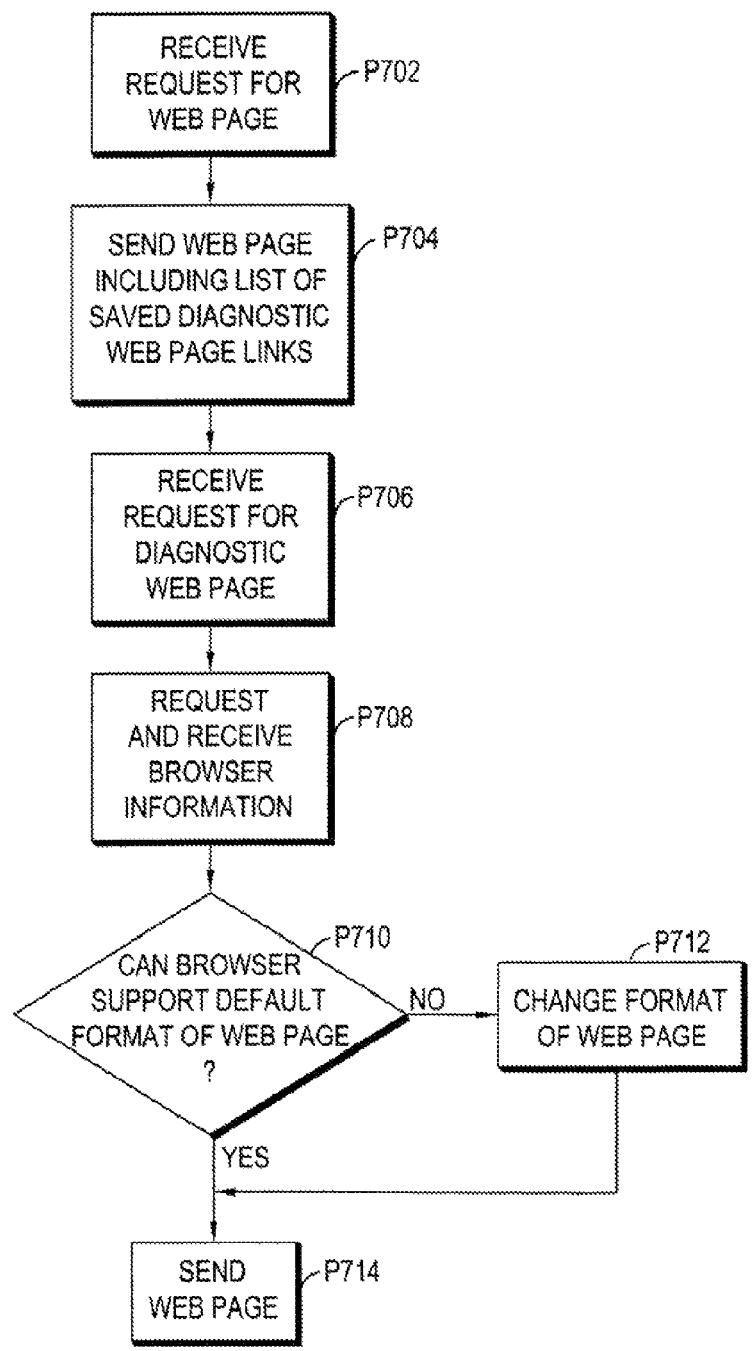
FIGS. 7A and 7B illustrate processing in other embodiments of the invention in which the diagnostic web page is reformatted, as necessary, before sending the web page to the browser.

FIG. 7A shows the processing in an embodiment of the invention which determines whether a browser in device 104 can support a default format of the web page of diagnostic information.

At P702, either machine vision tool computer 102 or storage device 110 receives a request for the diagnostic web page.

At P704, a web page including a list of saved diagnostic web page links is sent to device 104. FIG. 8 shows an example of a display of such a web page. The web page displays the machine to which the diagnostics pertain and the machine vision tool.

At P706, a user selects one of the diagnostic web pages from a screen, such as shown in FIG. 8, via, for example, a pointing device, and the request is sent to either machine vision tool computer 102 or remote storage device 110.

P708 is an optional act. Most browsers send identifying information. In such a case, P708 would not be needed. However, the machine vision tool may require some additional information from the browser, for example, information about pugins. In this case, act P708 would be performed to obtain the additional information At P710, a check is made to determine whether the browser can support a default format of the web page. For example, if the default format includes SVG graphics, and the browser supports SVG graphics, then at P714, the web page is sent to device 104 and is displayed by the browser. If the check at P710 determines that the browser cannot support the default format of the web page, a determination is made as to what format of the web page is supported by the browser and at P712, the format of the web page is converted to a format supported by the browser and sent to device 104 for display by the browser, at P714.

Figure 7B:
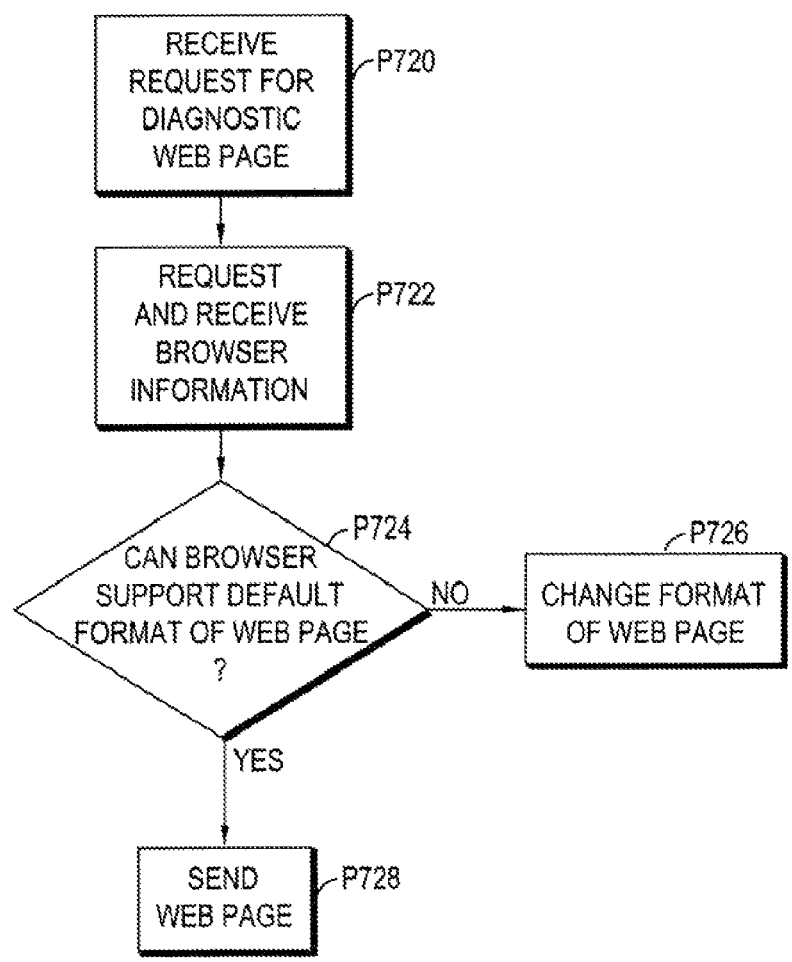

If the machine vision tool is configured to store diagnostic information to a specific web page address and the web browser user requests the diagnostics information by requesting the specific web page, the machine vision tool processing is as shown in FIG. 7B.

At P720, the machine vision tool computer or storage device 110 receives the request for the diagnostic web page.

Acts P722 through P728 correspond to acts P708 through P714, respectively, of FIG. 7A and therefore will not be further described.

As mentioned earlier, the illustrated embodiment produces a diagnostic web page including SVG format, which includes overlay images that can be enabled or disabled from displaying on a display by an SVG capable browser.

Figure 10:
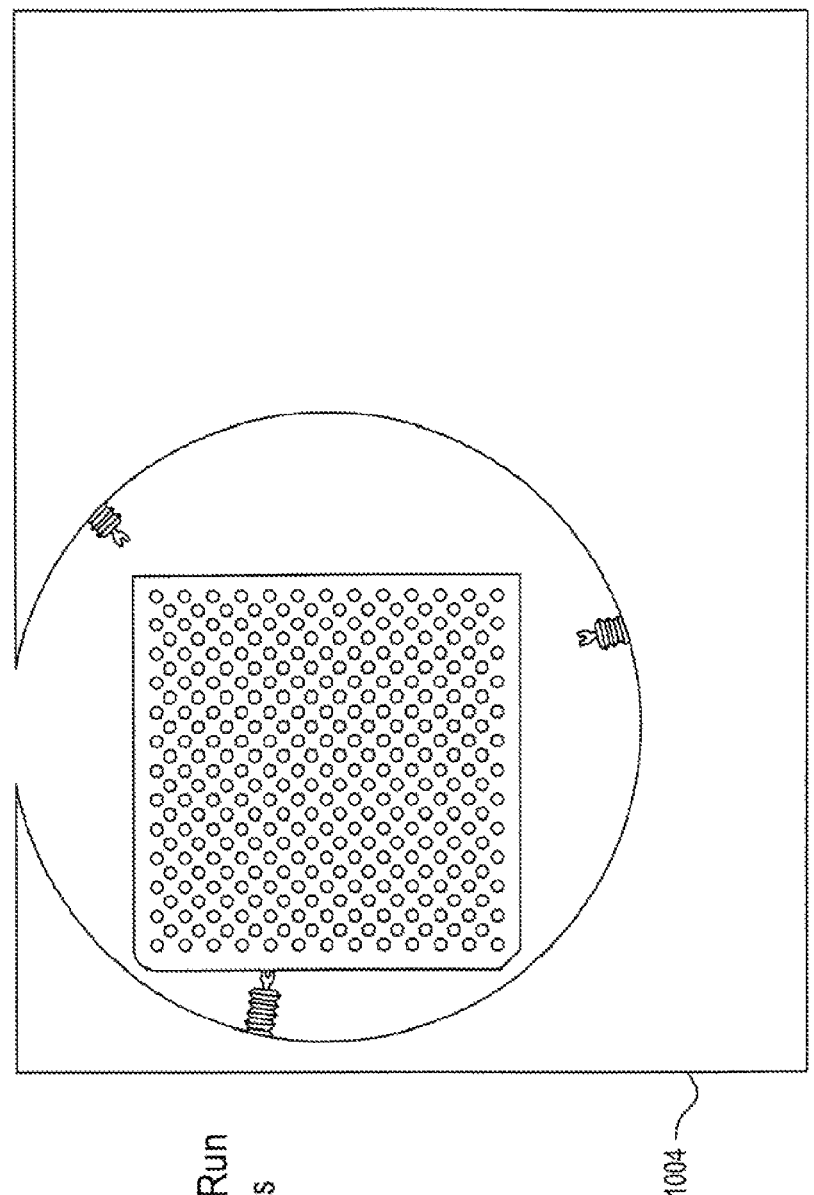
FIGS. 10-18 show examples of images with different overlay information enabled and disabled.

FIG. 10 shows an example of a diagnostic web page produced by a BGA Finder tool. This particular example was produced using SVG format. Controls 1002 allow a user to select or deselect various overlay images to be displayed on image 1004.

Figure 11:
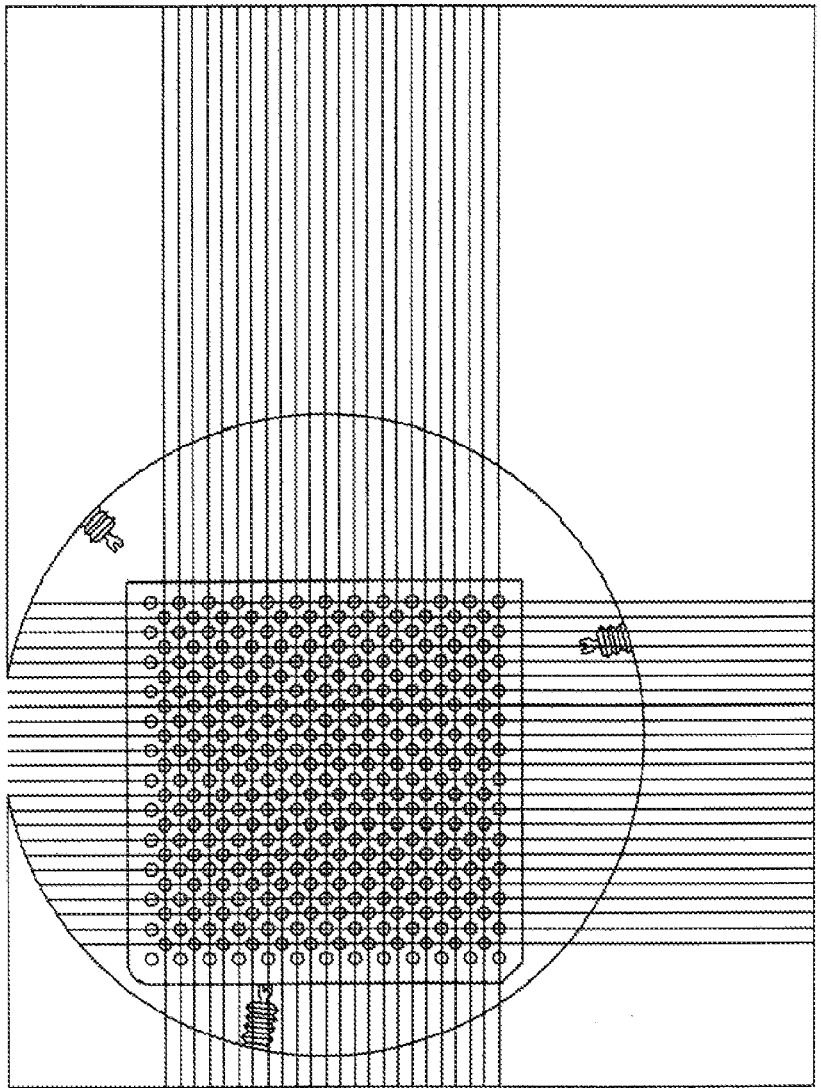

At FIG. 11, grid lines, X lines and Y lines have been selected for overlaying on image 1004. The above-mentioned overlays may be selected using a pointing device, for example, a computer mouse and clicking on the appropriate control to select or deselect that overlay image for displaying or inhibiting from display. One can see the overlays of the grid lines overlaid on image 1004 as compared with the same image in FIG. 10. It should be noted that a web page, such as one with SVG format, is downloaded to device 104, which may include an SVG compatible browser, with image information and all overlay image information. Thus, when a user selects or deselects a control 1002, the SVG compatible browser displays or inhibits from display the associated overlay without the need for any further communication with the source of the web page. In other words, all information has been downloaded to the device having the browser and no further communication with the source of the web page is needed to receive images including or excluding particular overlays.

Figure 12:
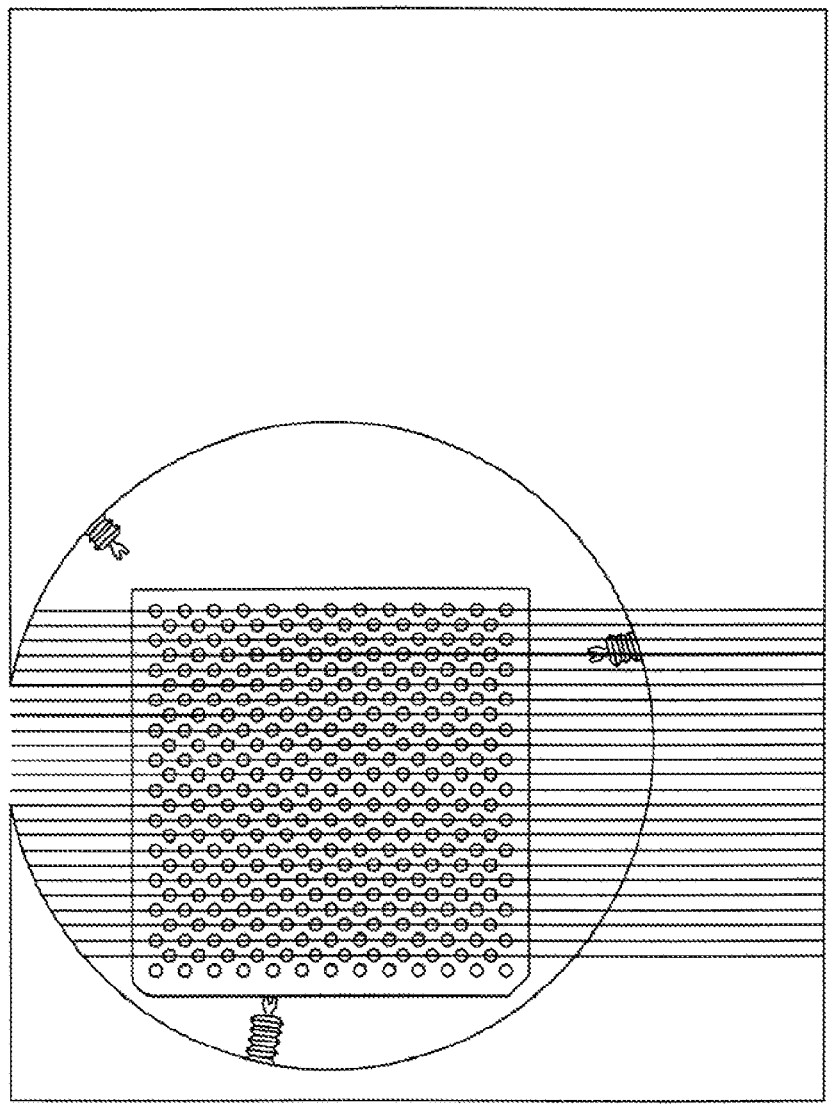

FIG. 12 shows image 1004 with only the overlays corresponding to the X lines enabled. Thus, the X lines are the only overlay on image 1004.

Figure 13:
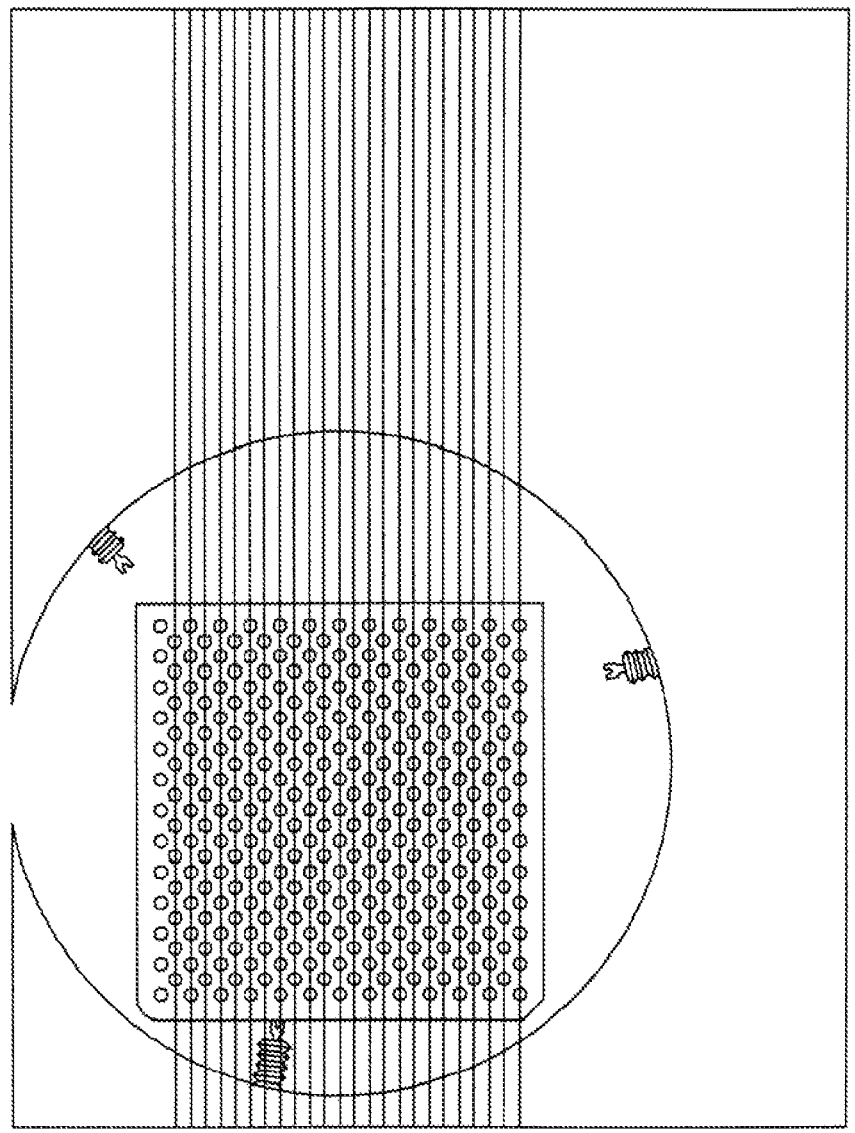

FIG. 13 shows image 1004 with Y lines being the only overlay enabled.

Figure 14:
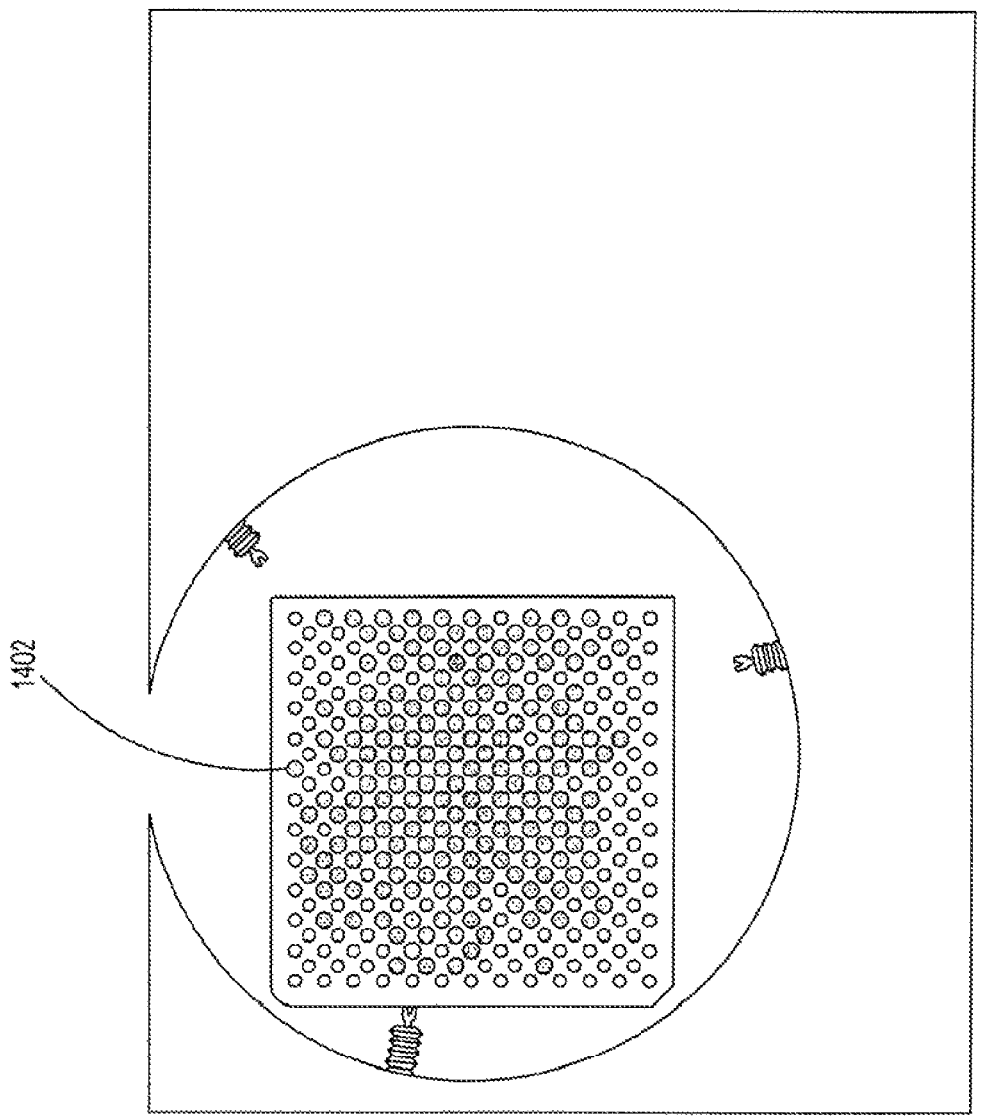

FIG. 14 shows image 1004 with overlays only for coarse results being enabled, thereby displaying overlays showing results of the coarse results portions 1402 of the BGA Finder tool.

Figure 15:
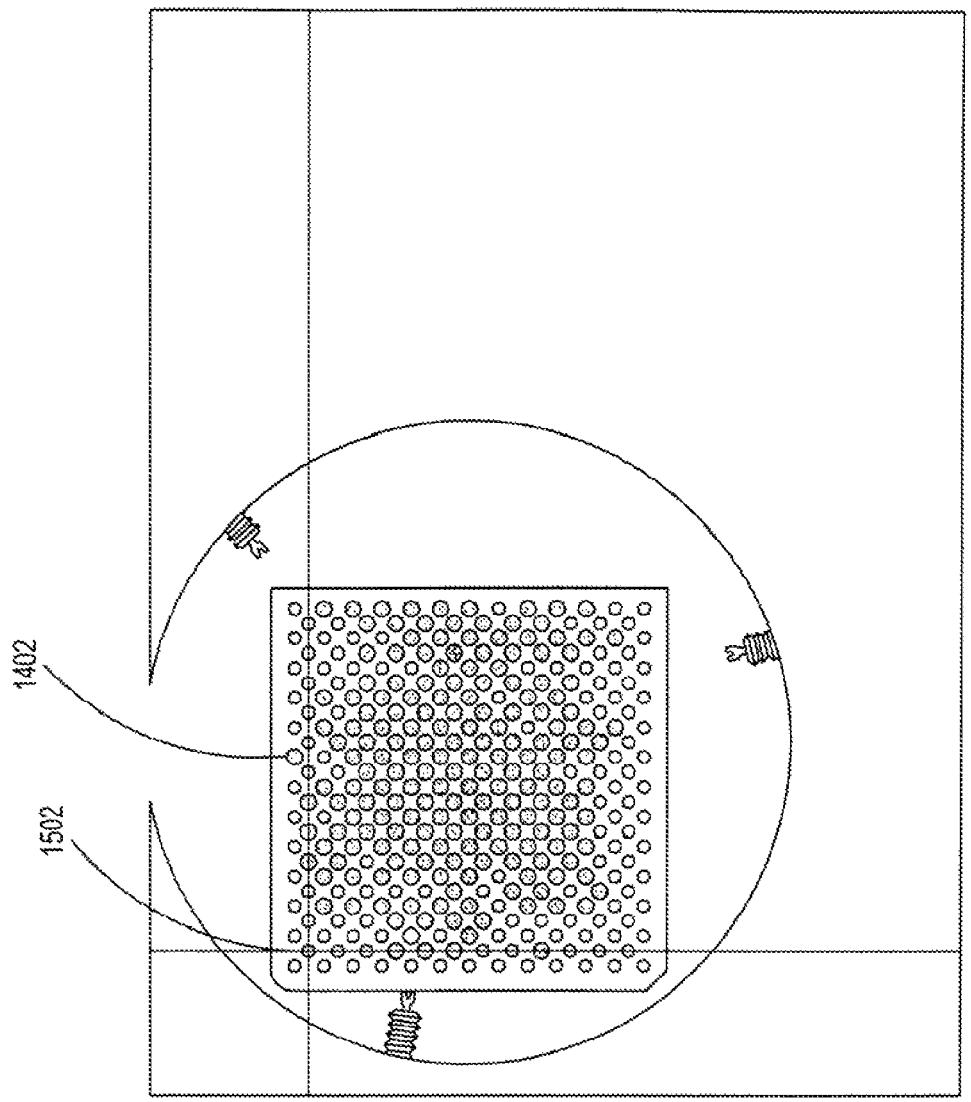

FIG. 15 shows image 1004 and overlays for coarse results 1402 and an initial origin 1502 of the image.

Figure 16:
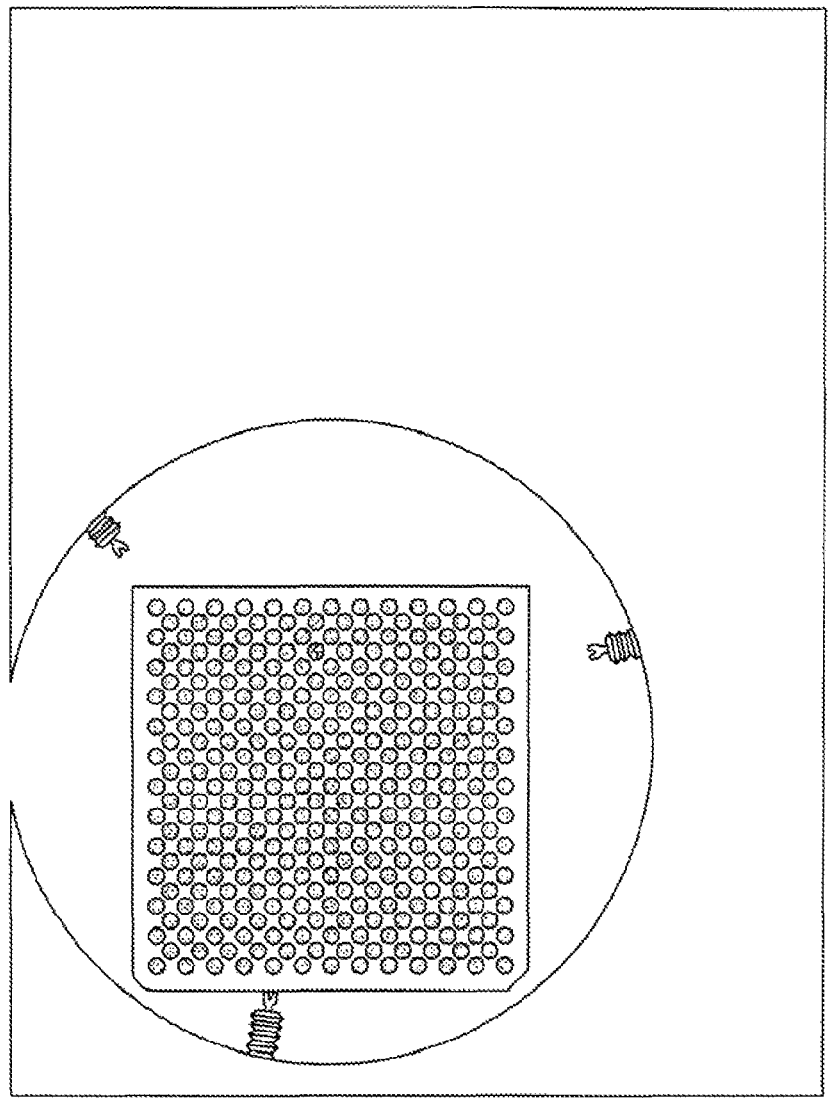

FIG. 16 shows image 1004 and an overlay showing results of the BGA Finder tool, wherein each found ball grid array is highlighted by an overlay.

Figure 17:
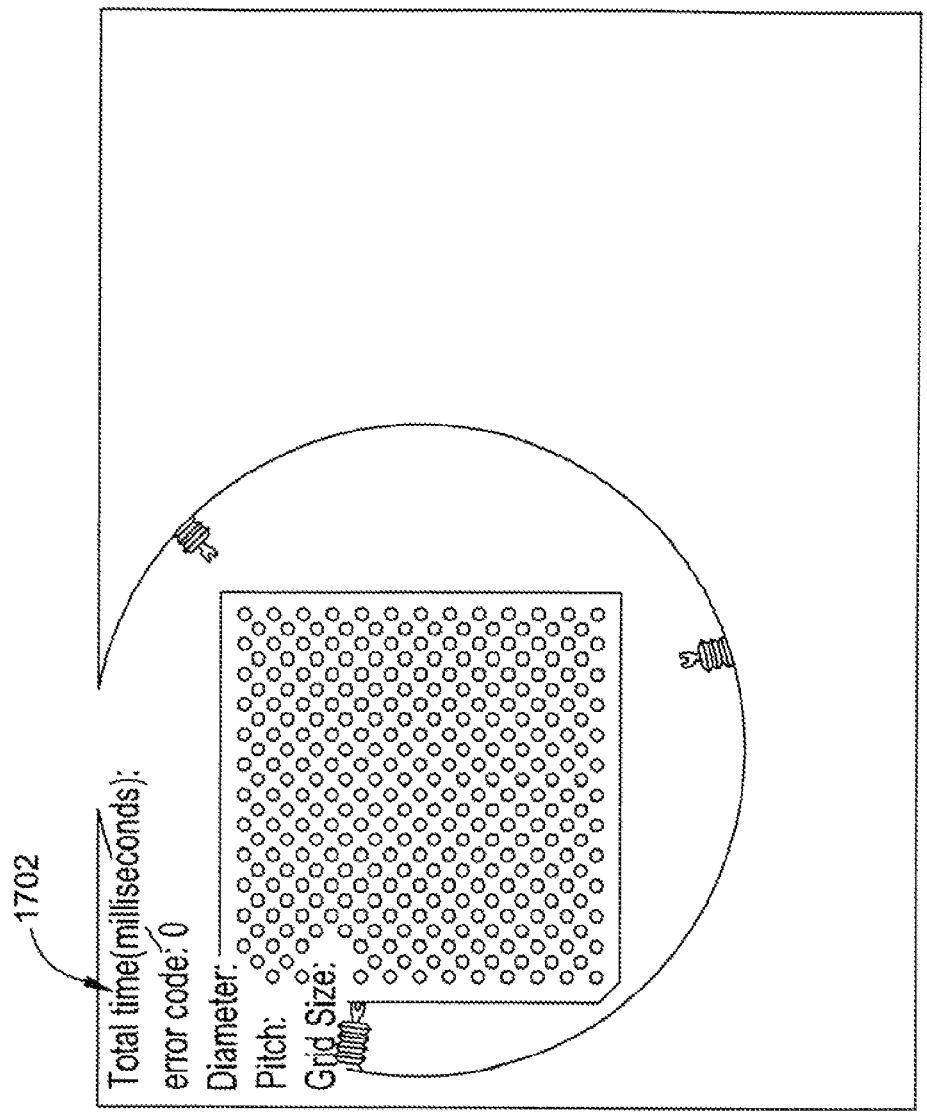

FIG. 17 shows image 1004 having overlays showing a results text 1702 describing results of the BGA finder tool. The results text, in this example, shows the total run time being 1202 milliseconds and information describing error code, diameter, pitch and grid size.

Figure 18:
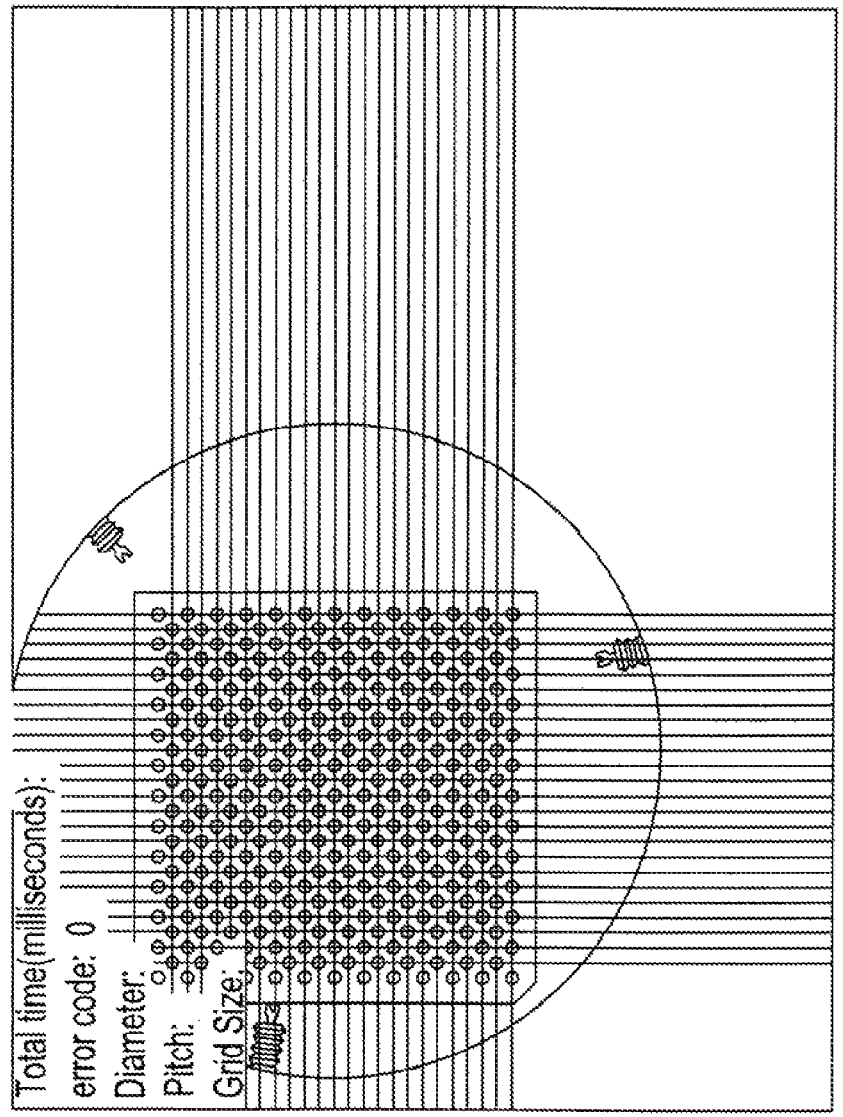

FIG. 18 shows image 1004 with all overlay images enabled.

Each of the overlays may represent a result of a different step of the machine vision tool. Thus, for example, a user could view the results of different steps of the machine vision tool's analysis by choosing selected overlays for viewing on a browser.

As mentioned earlier, other formats can be included in the web page. For example, images can be displayed in JPEG format. When JPEG format is used, each time a user selects overlay information via controls 1002, a request is sent to either machine vision tool computer 102, having storage device 108, or to remote storage device 110, requesting a JPEG image having the selected overlay images appearing in the image and the deselected overlay images not appearing in the image.

Flash format, by Macromedia, is an example of another format that can be used to create a diagnostics web page for viewing via a browser capable of supporting the Flash format via, for example, a plug-in.

As described above, the overlaid information may include graphics and textual information. Further, the diagnostic text may also be plain text on a web page and not overlaid.

The processing as described above may be performed via software, hardware, firmware, or any combination of the above. Any data handled in the processing or created as a result of the processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic discs, rewriteable optical discs, and so on. For purposes of the disclosure herein, a computer-readable media may comprise any form of data storage mechanism, including such existing memory technologies as well as hardware or circuit representations of such structure and of such data. Such computer-readable media may include a program or programs for a device including a processor and storage to carry out the program processes.

While the invention has been described with reference to certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts and materials, the invention is not to be limited to the particulars disclosed, but rather extends to all equivalent structures, acts, and materials, such as are within the scope of the appended claims.

What is claimed is:

1. Apparatus comprising:
a remote device capable of being located remotely from a machine vision device, the remote device including a remote display configured to receive and to display, when the remote device is located remotely from the machine vision device, given machine vision diagnostic data about a given machine vision tool on the machine vision device, the given machine vision diagnostic data, as displayed by the remote device, including plural discrete results of a given machine vision process of the given machine vision tool at respective discrete times within the given machine vision process;
a remote display interface preconfigured to provide the remote display with limited access to display select information from the machine vision device independently of what is being displayed on a screen of the machine vision device, the select information being displayed when the remote device is located remotely from the machine vision device, and the select information including the given machine vision diagnostic data;
a selection interface configured to allow a user to select, for display on the remote display, via a computer screen remote from the machine vision device, from among plural selectable computer screen displayed representations of the plural discrete results, less than all the plural discrete results, in accordance with the selection via the selection interface.

2. The apparatus according to claim 1, further comprising the machine vision device including a set of machine vision tools, the machine vision tools being configured to carry out respective machine vision processes.

3. The apparatus according to claim 2, further comprising a data provider configured to provide the given machine vision diagnostic data about the given machine vision tool.

4. The apparatus according to claim 3, wherein the machine vision diagnostic data includes interactive diagnostic data about the given machine vision tool.

5. The apparatus according to claim 3, wherein the machine vision device comprises a machine vision tool including a diagnostic capability mechanism including the data provider.

6. The apparatus according to claim 5, wherein the machine vision tool with the diagnostic capability mechanism includes a ball grid array (BGA) finder tool configured to ascertain a description of a BGA device from an image of the BGA device and information about the physical size of pixels.

7. The apparatus according to claim 1, wherein the remote device is located remotely from the machine vision device by separating the devices from each other via a network.

8. The apparatus according to claim 7, wherein the network includes the Internet.

9. The apparatus according to claim 1, wherein the at least one of the plural discrete results includes information representing different steps within a machine vision process performed by the given machine vision tool.

10. The apparatus according to claim 1, wherein the selection interface is at a same location as the remote device.

11. The apparatus according to claim 1, wherein the plural discrete results include a plural subset, all, or more of an overlay display of coarse results of the given machine vision tool, an overlay display of grid lines, an overlay display of an initial origin, an overlay display of results of the given machine vision tool, and a display of results text.

12. The apparatus according to claim 1, wherein the plural discrete results include results to be displayed by the remote device as one or more overlay images.

13. The apparatus according to claim 12, wherein the plural discrete results also include overlay text.

14. The apparatus according to claim 1, further including a notification mechanism configured to notify a user of an existence of the given machine vision diagnostic data, the notification mechanism including an email sender to send an email to the user, the email including a link to an Internet browser accessible web page.

15. The apparatus according to claim 2, wherein the machine vision device includes a storage device storing the given machine vision diagnostic data.

16. The apparatus according to claim 1, wherein the remote device includes a storage device storing the given machine vision diagnostic data.

17. The apparatus according to claim 1, wherein the remote device includes a thin client.

18. The apparatus according to claim 1, wherein the remote device includes a web browser.

19. The apparatus according to claim 1, further comprising an interactive diagnostic data requester configured to allow a user to submit, via a computer screen, all parameters needed to run the given machine vision tool.

20. The apparatus according to claim 1, wherein the given machine vision tool includes a diagnostic setting configured to save machine vision diagnostic information based on a set of configuration parameters.

21. The apparatus according to claim 20, wherein the configuration parameters indicate that machine vision diagnostic information of the given machine vision tool is to be saved upon each inspection failure of the given machine vision tool.

22. The apparatus according to claim 20, wherein the configuration parameters indicate that machine vision diagnostic information about the given machine vision tool is to be saved upon every run of the given machine vision tool.

23. The apparatus according to claim 20, wherein the configuration parameters indicate that machine vision diagnostic information about the given machine vision tool is to be saved upon every nth run of the given machine vision tool.

24. A method comprising:
 providing a remote device capable of being located remotely from a machine vision device, the remote device including a remote display configured to receive and to display, when the remote device is located remotely from the machine vision device, given machine vision diagnostic data about a given machine vision tool on the machine vision device, the given machine vision diagnostic data, as displayed by the remote device, including plural discrete results of a given machine vision process of the given machine vision tool at respective discrete times within the given machine vision process;
 providing a remote display interface preconfigured to provide the remote display with limited access to display select information from the machine vision device independently of what is being displayed on a screen local to the machine vision device, the select information being displayed when the remote device is located remotely from the machine vision device, and the select information including the given machines vision diagnostic data; and
 presenting to a user, via a computer screen remote from the machine vision device, plural selectable computer screen displayed representations of the plural discrete results, and accepting from the user, via the computer screen, a selection for display on the remote display of less than all the plural discrete results in accordance with the selection.

25. The method according claim 24, further including providing a machine vision device including a set of machine vision tools, the set of machine vision tools including the given machine vision tool, the machine vision tools being configured to carry out respective machine vision processes.

26. The method according to claim 25, further comprising providing the given machine vision diagnostic data about the given machine vision tool.

27. Apparatus comprising:
 a remote display interface preconfigured to cause a remote display to display, when the remote display is remote from a machine vision device, given machine vision diagnostic data about a given machine vision tool on the machine vision device, the given machine vision diagnostic data, as displayed by the remote device, including plural discrete results of a given machine vision process of the given machine vision tool at respective discrete times within the given machine vision process;
 the remote display interface being, preconfigured to cause the remote display to have limited access to display select information from the machine vision device independently of what is being, displayed on a screen local to the machine vision device, the select information displayed when the remote display is located remotely from the machine vision device including the given machine vision diagnostic data; and
 a selection interface configured to allow a user to select, for display on the remote display, via a computer screen remote from the machine vision device, from among plural selectable computer screen displayed representations of the plural discrete results, less than all the plural discrete results in accordance with the selection via the selection interface.

* * * * *